(12) United States Patent
Zhong

(10) Patent No.: US 11,228,703 B2
(45) Date of Patent: Jan. 18, 2022

(54) METHOD FOR CONTROLLING CAMERA MODULE, ELECTRONIC DEVICE, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Peng Zhong, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/332,387

(22) Filed: May 27, 2021

(65) Prior Publication Data

US 2021/0289130 A1 Sep. 16, 2021

Related U.S. Application Data

(63) Continuation of application No. PCT/CN2019/105424, filed on Sep. 11, 2019.

(30) Foreign Application Priority Data

Nov. 30, 2018 (CN) .......................... 201811459606.6

(51) Int. Cl.
*H04N 5/232* (2006.01)
*H04N 5/225* (2006.01)

(52) U.S. Cl.
CPC ....... *H04N 5/23219* (2013.01); *H04N 5/2252* (2013.01); *H04N 5/2257* (2013.01); *H04N 5/232933* (2018.08)

(58) Field of Classification Search
CPC ......... H04N 5/23219; H04N 5/232933; H04N 5/2252; H04N 5/2257; H04N 5/232; H04M 1/0264
See application file for complete search history.

(56) References Cited

U.S. PATENT DOCUMENTS

2005/0014527 A1  1/2005 Chambers et al.
2013/0135328 A1* 5/2013 Rappoport ........... G09G 3/3225
345/522

(Continued)

FOREIGN PATENT DOCUMENTS

CN   104038698 A   9/2014
CN   104918309 A   9/2015

(Continued)

OTHER PUBLICATIONS

International Search Report with English Translation for PCT Application PCT/CN2019/105424 dated Dec. 10, 2019. (22 pages).

(Continued)

*Primary Examiner* — Mekonnen D Dagnew
(74) *Attorney, Agent, or Firm* — Young Basile Hanlon & MacFarlane, P.C.

(57) ABSTRACT

The disclosure provides a method for controlling a camera module. The camera module is removable between a first position received in a body of the electronic device and a second position exposed from the body. The method includes: driving the camera module to slide to the second position based on a call request on the camera module sent by a camera application, in response to the camera application running in a system foreground; determining whether a current application is a preset application, in response to an application in the system foreground switching from the camera application to the current application; determining whether receiving a call request on the camera module sent by the current application in response to the current application being the preset application; and maintaining the camera module in the second position within a preset duration, in response to not receiving the call request.

20 Claims, 8 Drawing Sheets

(56) References Cited

U.S. PATENT DOCUMENTS

| | | | | |
|---|---|---|---|---|
| 2017/0070679 A1* | 3/2017 | Chung | ................ | G09G 3/3275 |
| 2018/0324286 A1* | 11/2018 | Cheng | ................ | H04M 1/0264 |
| 2019/0096310 A1* | 3/2019 | Chen | ................ | G09G 3/2003 |
| 2020/0396368 A1* | 12/2020 | Zhu | ................ | H04N 5/23225 |
| 2021/0058502 A1* | 2/2021 | Liao | ................ | H04M 1/0214 |

FOREIGN PATENT DOCUMENTS

| | | | |
|---|---|---|---|
| CN | 105554196 | A | 5/2016 |
| CN | 106856516 | A | 6/2017 |
| CN | 108196621 | A | 6/2018 |
| CN | 108829461 | A | 11/2018 |
| CN | 108833623 | A | 11/2018 |
| CN | 108845836 | A | 11/2018 |
| CN | 108897375 | A | 11/2018 |
| CN | 109246361 | A | 1/2019 |
| CN | 109547598 | A | 3/2019 |

OTHER PUBLICATIONS

Notice of Allowance with English Translation for CN Application 201811459606.6 dated May 8, 2020. (8 pages).
Chinese First Office Action with English Translation for CN Application 201811459606.6 dated Nov. 5, 2019. (15 pages).

* cited by examiner

METHOD FOR CONTROLLING CAMERA MODULE, ELECTRONIC DEVICE, AND COMPUTER-READABLE STORAGE MEDIUM

CROSS-REFERENCE TO RELATED APPLICATION(S)

This application is a Continuation Application of International Application No. PCT/CN2019/105424 filed on Sep. 11, 2019, which claims priority to Chinese Patent Application No. 201811459606.6 filed on Nov. 30, 2018, the entire contents of both of which are hereby incorporated by reference.

TECHNICAL FIELD

The disclosure relates to the field of electronic technologies, in particular to a method for controlling a camera module for controlling a camera module, an electronic device, and a computer-readable storage medium.

BACKGROUND

With popularization of portable electronic devices such as smart phones, it may become major trends for optimization of aesthetics and functionality of the electronic devices. For example, improvement in a screen-to-body ratio of the electronic device may be one of popular trends.

In the related art, a front panel of the electronic device is provided with a camera module and other components, to provide a user with a front camera service. Therefore, contradiction between a ration of an installation space of the camera module on the front panel and the improvement in the screen-to-body ratio needs to be resolved urgently.

SUMMARY

Embodiments of the disclosure in a first aspect provide a method for controlling a camera module. The camera module is removable between a first position received in a body of the electronic device and a second position exposed from the body. The method includes: driving the camera module to slide to the second position based on a call request on the camera module sent by a camera application, in response to the camera application running in a system foreground; determining whether a current application is a preset application, in response to an application in the system foreground switching from the camera application to the current application; determining whether receiving a call request on the camera module sent by the current application in response to the current application being the preset application; and maintaining the camera component in the second position within a preset duration, in response to not receiving the call request.

Embodiments of the disclosure in a second aspect provide an electronic device. The electronic device includes a body, a camera module removable between a first position received in the body and a second position exposed from the body, a memory, a processor electrically coupled to the memory, and a computer program stored on the memory and for running on the processor. The processor is configured to, execute the computer program on the memory to: drive the camera module to slide to the second position based on a call request on the camera module sent by a camera application, in response to the camera application running in a system foreground; determine whether a current application is a preset application, in response to an application in the system foreground switching from the camera application to the current application; determine whether receiving a call request on the camera module sent by the current application in response to the current application being the preset application; and maintain the camera component in the second position within a preset duration, in response to not receiving the call request.

Embodiments of the disclosure in a third aspect provide a non-transitory computer-readable storage medium with a computer program stored thereon. In response that the computer program is executed by a processor of an electronic device, the electronic device is caused to perform the method for controlling a camera module based on the above embodiments.

Additional aspects and advantages of the disclosure will be given in part in the following descriptions, become apparent in part from the following descriptions, or be learned from the practice of the disclosure.

BRIEF DESCRIPTION OF DRAWINGS

The above and/or additional aspects and advantages of the disclosure become obvious and easy to understand from the following description of the embodiments in combination with the accompanying drawings, in which.

DETAILED DESCRIPTION

Figure 1:
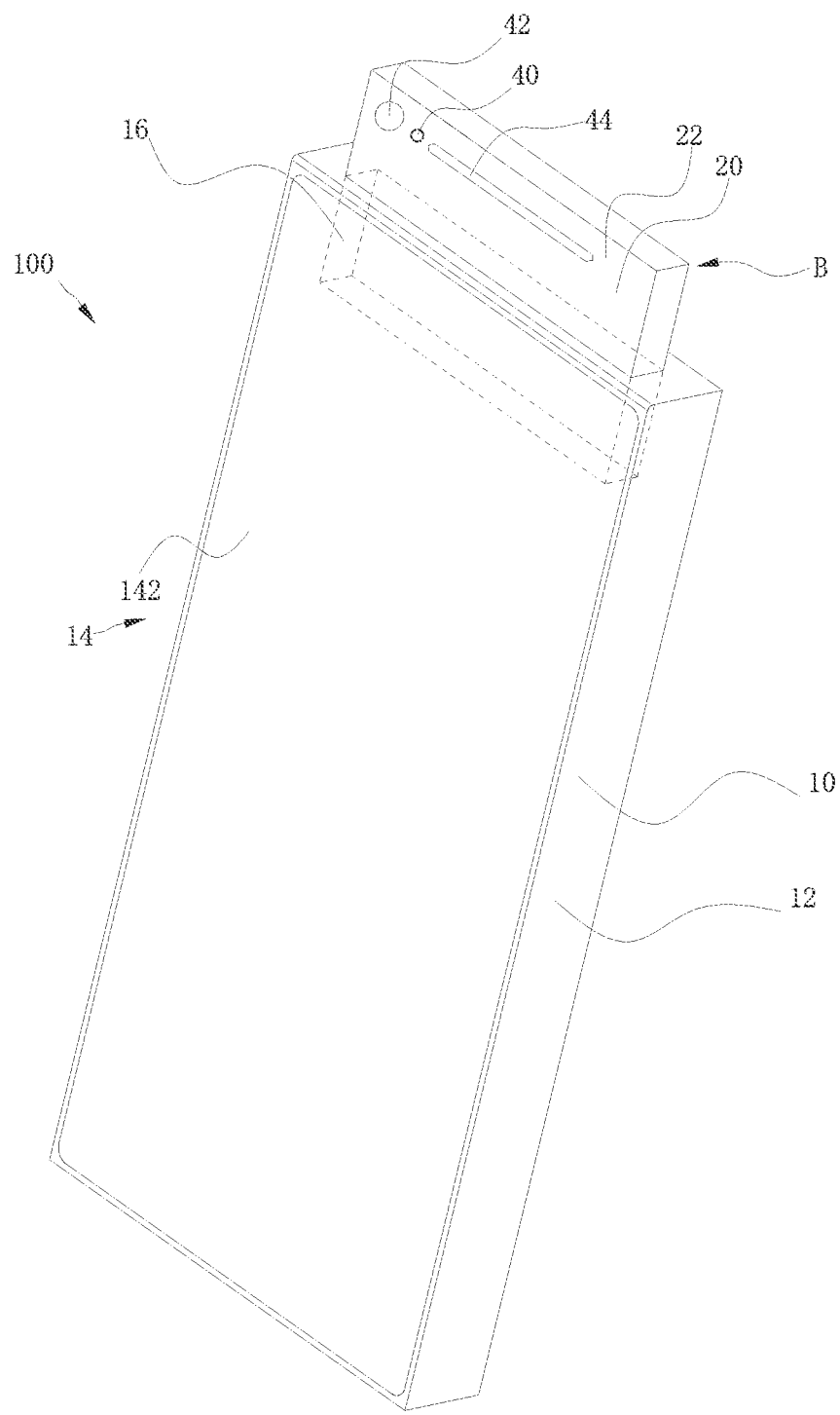
FIG. 1 is a schematic diagram of a state of an electronic device in a second position according to embodiments of the disclosure.
Figure 2:
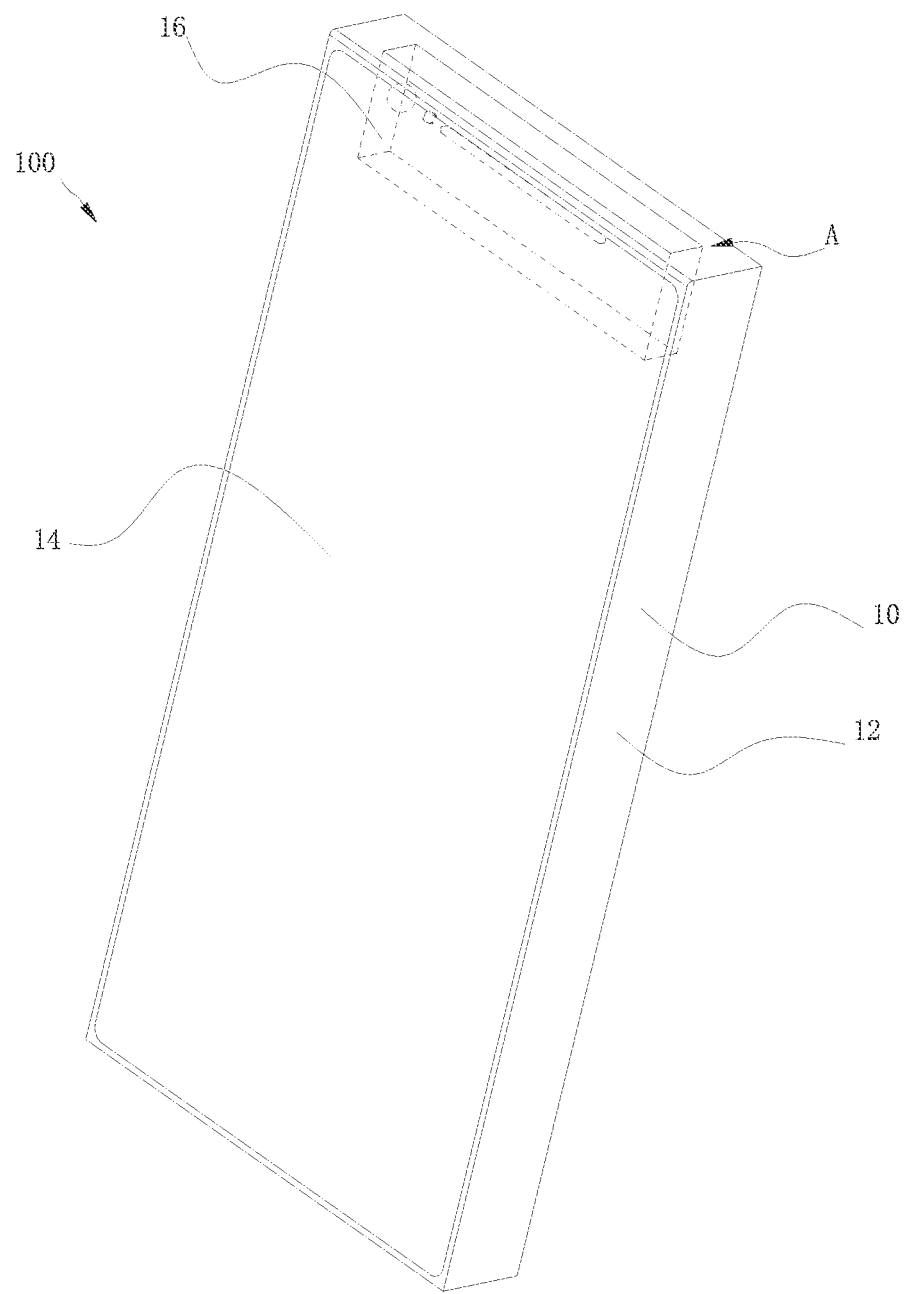
FIG. 2 is a schematic diagram of the state of the electronic device in a first position according to embodiments of the disclosure.
Figure 3:
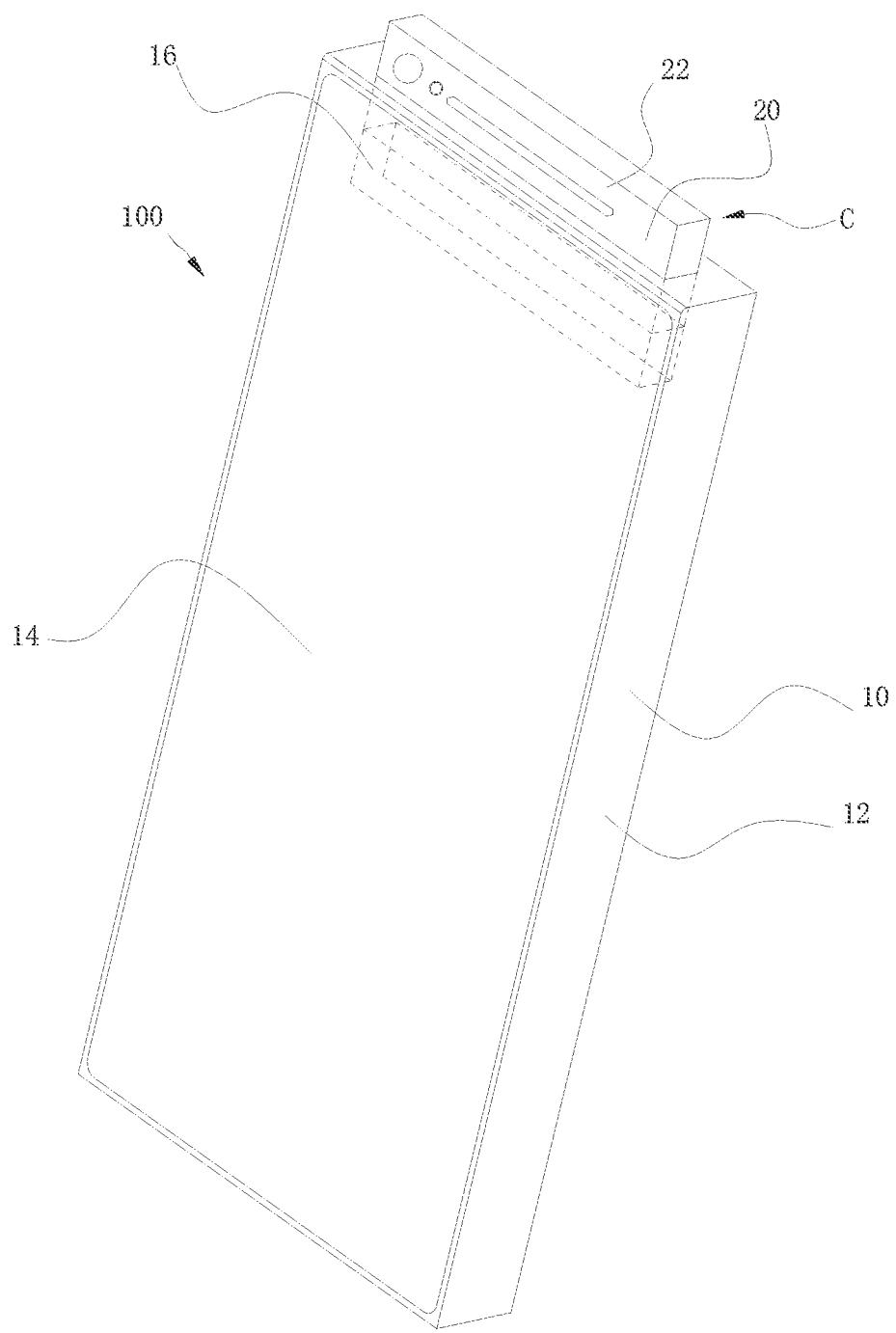
FIG. 3 is a schematic diagram of the state of the electronic device in a third position according to embodiments of the disclosure.
Figure 4:
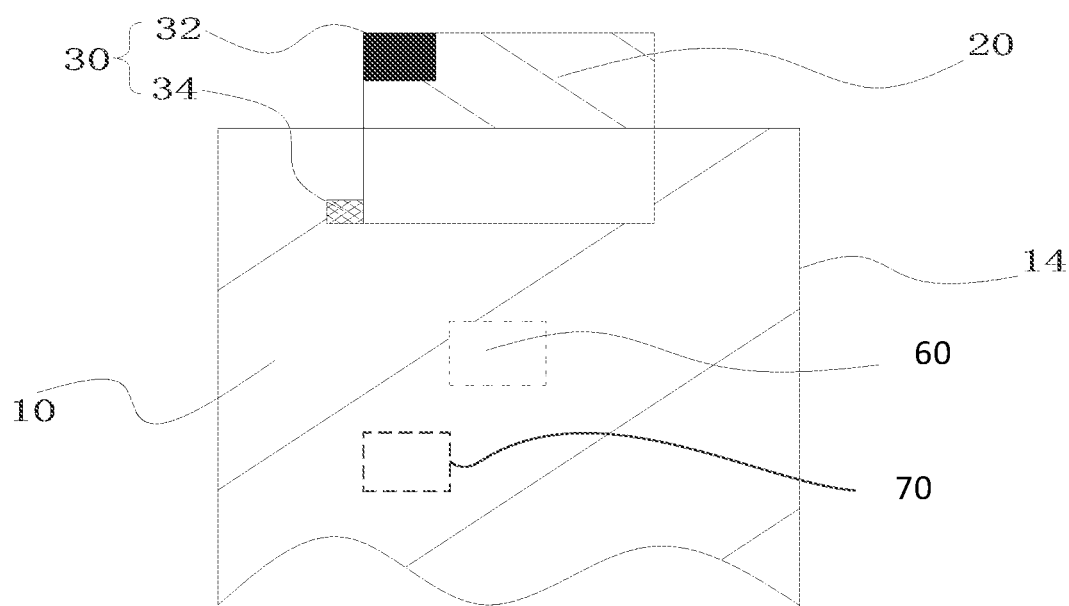
FIG. 4 is a schematic diagram of a structure of a detecting component according to embodiments of the disclosure.

Reference will be made in detail to embodiments of the disclosure. Examples of the embodiments are illustrated in accompanying drawings, in which the same or similar elements and the elements having same or similar functions are denoted by like reference numerals throughout the descriptions. The embodiments described herein with reference to drawings are explanatory, illustrative, and used to generally understand the disclosure. The embodiments shall not be construed to limit the disclosure.

In the description of the disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise" refer to the directions and location relations which are the directions and location relations shown in the drawings, and for describing the disclosure and for describing in simple, and which are not intended to indicate or imply that the device or the elements are disposed to locate at the specific directions or are structured and performed in the specific directions, which could not to be understood to the limitation of the disclosure. In addition, terms such as "first" and "second" are used herein for purposes of description and are not intended to indicate or imply relative importance or significance. Furthermore, the feature defined with "first" and "second" may comprise one or more this feature distinctly or implicitly. In the description of the disclosure, "a plurality of" means two or more than two, unless specified otherwise.

In the disclosure, unless specified or limited otherwise, the terms "mounted," "connected," "coupled" and "fixed" are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components, which can be understood by those skilled in the art according to the detail embodiment of the disclosure.

In the disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

Many different embodiments or examples are provided in the disclosure herein to implement different structures of the disclosure. To simplify the disclosure of the disclosure, the components and settings of specific examples are provided below. Of course, they are merely examples, and are not intended to limit the disclosure. Furthermore, reference numbers and/or letters may be repeated in different examples of the disclosure. Such repetitions are for simplification and clearness, rather than indicating the relations of the discussed embodiments and/or settings. Moreover, the disclosure provides examples of various specific processes and materials, but the applicability of other processes and/or application of other materials may be appreciated by those having ordinary skill in the art.

A method for controlling a camera module and an apparatus for controlling a camera module, provided in embodiments of the disclosure, may be described below with reference to the accompanying drawings.

In detail, in order to reduce an influence of hardware device(s) installed on a front panel of the electronic device such as a camera module on the screen-to-body ratio, the disclosure provides a sliding component. The camera module may slide out as needed and may be received in a body of the electronic device as not needed through a controlling of sliding of the sliding component. As a result, when functional services of components such as the camera module are not performed, the front panel of the electronic device is not occupied.

In detail, as illustrated in FIGS. 1 to 4, and 7, an electronic device 100 according to the embodiments of the disclosure may include a body 10, a sliding component 20 and a driving component 50. The sliding component 20 is configured to slide between a first position A received in the body 10 and a second position B exposed from the body 10. The driving component 50 is configured to drive the sliding component 20 to slide between the first position received in the body and the second position exposed from the body.

Certainly, in order to make the driving component 50 know that the sliding component 20 slides to the corresponding position, the electronic device may also include the detecting component 30 for detecting the current position of the sliding component 20. In the embodiments of the disclosure, the detecting component 30 is configured to detect the position of the sliding component 20. The detecting component 30 includes a magnetic field generating element 32, a Hall element 34 and a processor 60. The magnetic field generating element 32 and the Hall element 34 are respectively fixed on the sliding component 20 and the body 10. The processor 60 is configured to receive a detection signal value output by the Hall element 34 and determine a current relative position of the sliding component 20 relative to the body 10 based on the detection signal value.

It is worth noting that "the magnetic field generating element 32 and the Hall element 34 are fixed on the body 10 and the sliding component 20 respectively" includes two situations. One is that the magnetic field generating element 32 is fixed on the body 10, and the Hall element 34 is fixed on the sliding component 20, the other is that the magnetic field generating element 32 is fixed on the sliding component 20, and the Hall element 34 is fixed on the body 10. In addition, the magnetic field generating element 32 and the Hall element 34 may be placed relative to each other in the vertical direction, or may be placed relative to each other in the horizontal direction. In other words, as long as the magnetic field generating element 32 and the Hall element 34 can generate relative motion, the specific positions of the magnetic field generating element 32 and the Hall element 34 are not restricted.

In some embodiments, the body 10 is formed with a sliding groove 16, and the sliding component 20 is received in the sliding groove 16 when at the first position A. In this way, the sliding component 20 is made to slide between the first position A and the second position B through the sliding groove 16.

In detail, the body 10 includes a housing 12 and a displaying component 14, and the housing 12 and the displaying component 14 are combined to form a closed structure. The sliding groove 16 is opened on the housing 12 so as to realize sliding-in and sliding-out of the sliding component 20. It is understood that the sliding groove 16 is opened on any side of the housing 12. Preferably, the sliding groove 16 is opened on the top edge of the housing 12, which conforms to the users' usage habits.

The displaying component 14 includes a touch panel (not illustrated) and a cover plate 142. The touch panel includes a displaying module (not illustrated) and a touch layer (not illustrated) provided on the displaying module. The displaying module is, for example, a liquid crystal display (LCD) Module (LCM). Certainly, the displaying module may be a flexible displaying module. The touch layer is configured to receive an input through touch from the user to generate a signal for controlling the content displayed in the displaying module and a signal for controlling the sliding of the sliding component 20.

The material of the cover plate 142 may be made of transparent materials such as glass, ceramics or sapphire. Since the cover plate 142 is configured as an input part of the electronic device 100, the cover plate 142 is often contacted by collisions or scratches. For example, when the user puts the electronic device 100 in the pocket, the cover plate 142 may be scratched and damaged by keys in the user's pocket. Therefore, the material of the cover plate 142 may be a material with a relatively high hardness, such as sapphire. Or, a hardened layer is formed on the surface of the cover plate 142 to improve a scratch resistance of the cover plate 142.

The touch panel and the cover plate 142 are bonded and fixed together, for example, by Optically Clear Adhesive (OCA). The OCA not only adheres and fixes the touch panel and the cover plate 142, but also may emit light from the touch panel.

Figure 5:
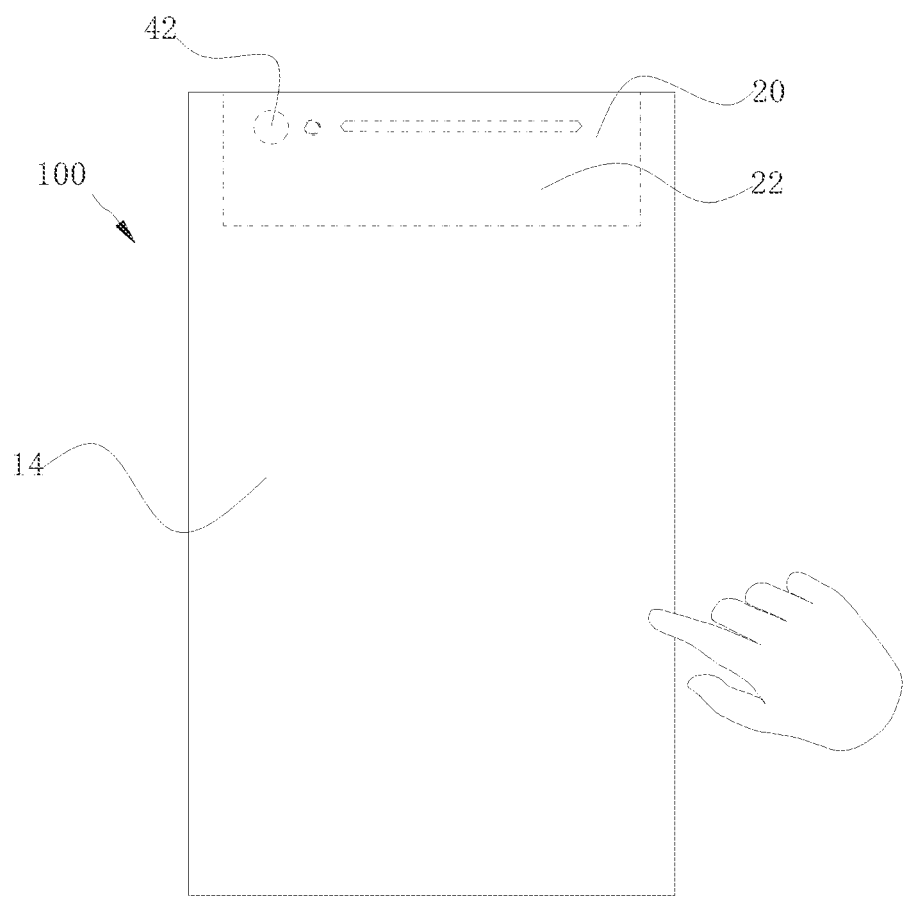
FIG. 5 is a diagram of a usage scene of an electronic device according to embodiments of the disclosure.

In order to more clearly illustrate the function of the sliding component 20 in the embodiments of the disclosure, referring to FIG. 5, in some embodiments, the electronic device 100 includes a camera module 42, the sliding component 20 includes a carrier 22, and the camera module 42 is provided on the carrier 22. In this way, the camera module 42 slides along with the sliding component 20. Certainly, the user turns on the camera module 42 and turns off the camera module 42 as trigger signals, that is, when the user turns on the camera module 42, the sliding component 20 is triggered to slide out, and when the user turns off the camera module 42, the sliding component 20 is triggered to slide back. In this way, the user only needs to turn on or off the camera module according to the existing habits, and does not need to perform additional operations on the sliding component 20, which is convenient for the user to use.

In addition to the camera module 42, other functional devices 40 may also be carried on the carrier 22, such as a light sensor, a proximity sensor and an earpiece 44, as illustrated in FIG. 1. These functional devices 40 may be exposed from the body 10 as the sliding component 20 slides out according to the input of the user, to work normally, or may be received in the body 10 as the sliding component 20 slides back according to the input of the user. In this way, the displaying component 14 is provided with as few through holes as possible, which is beneficial to satisfy the design requirements of the full screen of the electronic device 100.

In detail, when the light sensor is carried on the carrier 22, the light sensor is arranged on the top of the carrier 22, that is, when the sliding component 20 is completely received in the sliding groove 16, the light sensor is still exposed from the top of the carrier 22, so as to sense light in real time.

Figure 6:
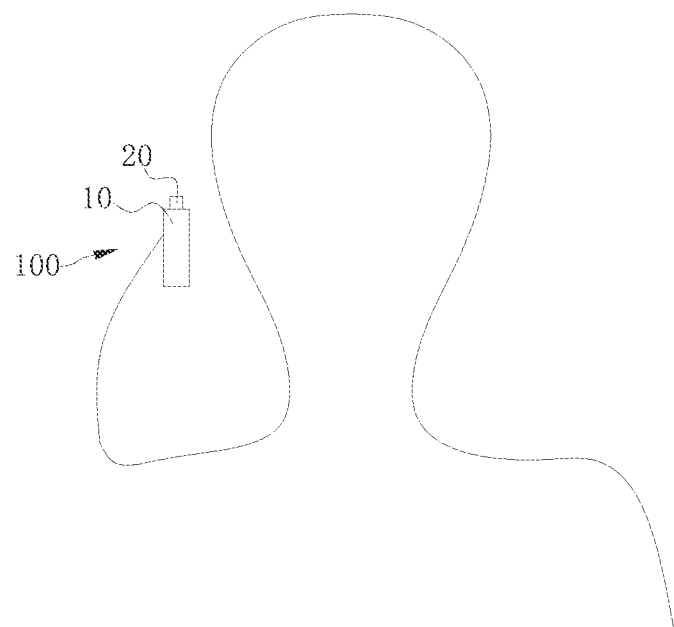
FIG. 6 is a diagram of another usage scene of the electronic device according to embodiments of the disclosure.

As illustrated in FIG. 6, when the carrier 22 carries the proximity sensor and the earpiece 44, the user may answer and hang up the call as trigger signals, that is, when the user answers the call, the sliding component 20 is triggered to slide out. When the user hangs up the phone, the sliding component 20 is triggered to slide back. In this way, the user only needs to answer or hang up the call according to the existing habits, and does not need to perform additional operations on the sliding component 20, which is convenient for the user to use.

It is understood that the plurality of functional devices 40 are carried on the same carrier 22 or on the plurality of carriers. When the plurality of functional devices 40 are carried on the same carrier 22, the plurality of functional devices 40 are arranged longitudinally, and the processor 60 controls the functional device 40 arranged at the lower part of the carrier 22 to expose by controlling a sliding distance of the sliding component 20. When the plurality of functional devices 40 are carried on the plurality of carriers 22, the processor 60 selects the functional device 40 to be exposed by controlling the sliding of a certain carrier 22.

Figure 7:
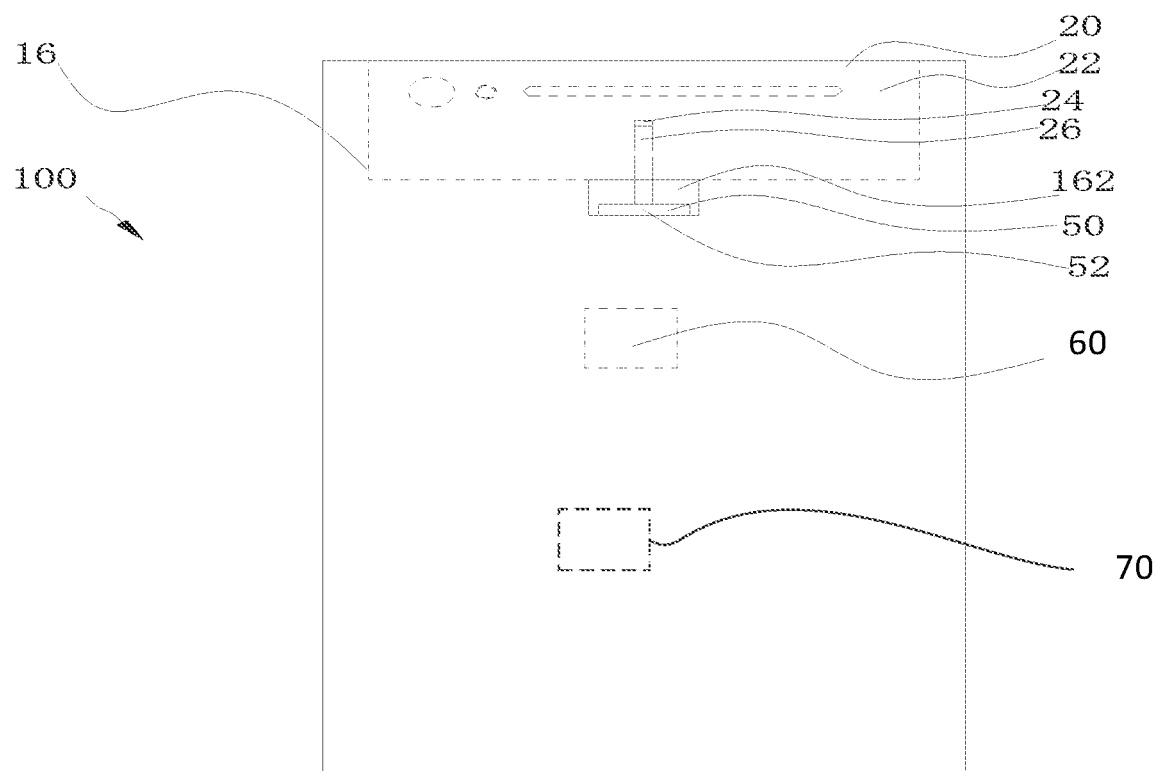
FIG. 7 is a schematic diagram of an electronic device according to embodiments of the disclosure.

As illustrated in FIG. 7, in some embodiments, the sliding component 20 includes a threaded hole 24 provided on the middle of the carrier 22 and a rotating screw 26 that cooperates with the threaded hole 24. The sliding groove 16 includes a groove 162 disposed opposite to the threaded hole 24 and located at the bottom of the sliding groove 16. The electronic device 100 includes a driving component 50 disposed in the groove 162. The driving component 50 includes a driving motor 52 coupled to the processor 60 and an output shaft (not illustrated) coupled to the bottom of the rotating screw 26.

It is understood that the processor 60 controls the sliding of the sliding component 20 by controlling the driving motor 52. When the user commands the sliding component 20 to slide from the first position A to the second position B, the processor 60 controls the driving motor 52 to rotate forward, so that the output shaft drives the rotating screw 26 to rotate in the threaded hole 24, thereby causing the sliding component 20 to slide from the first position A to the second position B. When the user commands the sliding component 20 to slide from the second position B to the first position A, the processor 60 controls the driving motor 52 to reverse, so that the output shaft drives the rotating screw 26 to rotate in the threaded hole 24, thereby causing the sliding component 20 to slide from the second position B to the first position A. It is noted that "from the first position A to the second position B" and "from the second position B to the first position A" herein refer to the sliding direction, rather than the start and end of sliding.

The electronic device 100 of the embodiments of the disclosure employs the Hall element 34 and the magnetic field generating element 32 to determine the current relative position of the sliding component 20. When the functional devices 40 such as the front camera are carried on the sliding component 20, the state of the sliding component 20 is detected in real time, thereby determining the position of the functional devices 40.

It is understood that the functional devices 40 such as the camera module 42 need to be exposed from the body 10, otherwise the functional devices 40 may not work normally. The electronic device 100 of the embodiments of the disclosure carries the functional devices 40 on the sliding component, so that the functional devices 40 may be received in the body 10 when they do not need to work, and may be exposed from the body 10 along with the sliding component 20 when they need to work. In this way, there is no need to open a through hole on the displaying component 14 for exposing the functional devices 40 such as the camera module 42, thereby increasing the screen-to-body ratio and improving the user experience.

However, the service life of the driving component and the service life of the sliding component are limited. If the driving component and the sliding component are saved when operations are unnecessary, the service life of the driving component and the service life of the sliding component are greatly prolonged, and the user experience is improved. For example, in the actual execution process, if the camera application calls the camera module, the camera module is driven to slide out by the driving component driving the sliding component. When the user switches to another application, the call on the camera module is released immediately, and the driving component is controlled to drive the sliding component to drive the camera module to slide in. However, when the user only stays in other application for a short duration and then returns to the camera application, the sliding component may be driven again to drive the camera module to slide out. Therefore, the camera module is controlled to slide in and out in a short duration, causing loss to the driving component and the sliding component. In order to avoid such loss, the disclosure recognizes such a scene that the camera application is temporarily turned off, sliding-in of the camera module is delayed to avoid sliding-in and sliding-out control of the camera module in a short duration.

The method for controlling the camera module is described below in detail.

Figure 8:
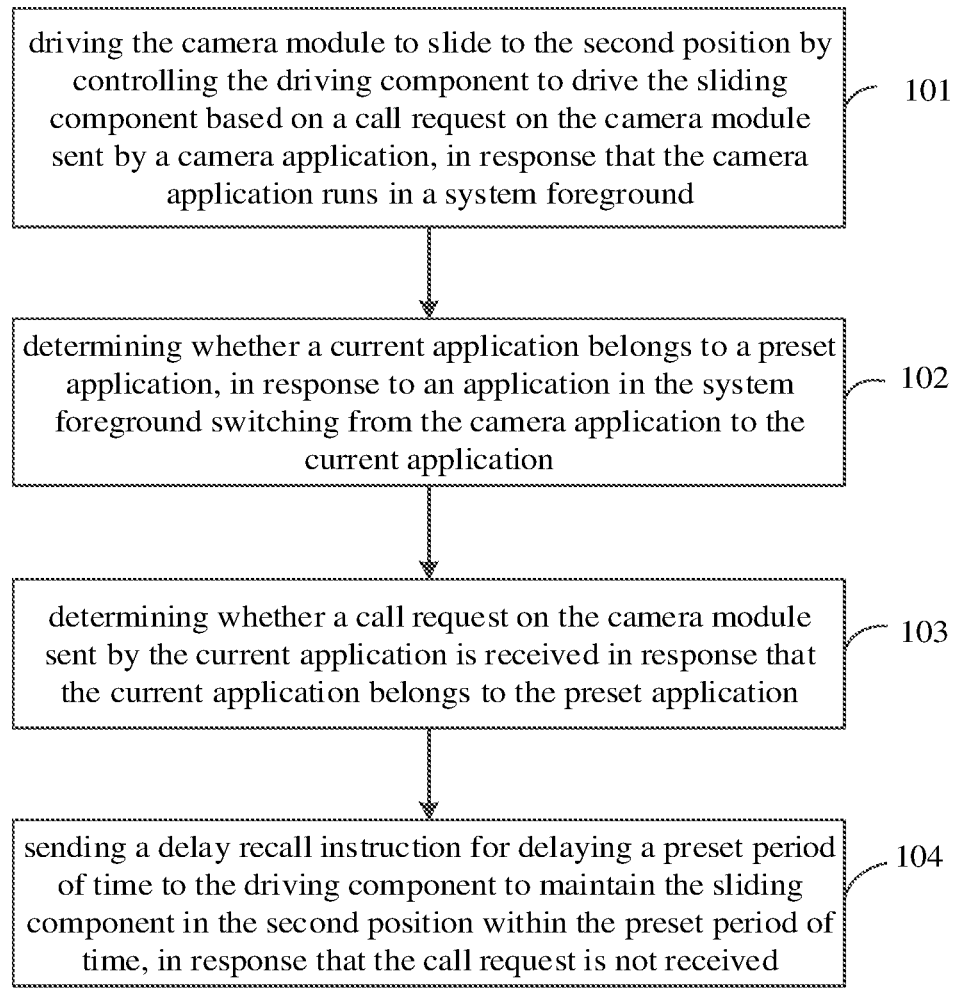
FIG. 8 is a flowchart of a method for controlling a camera module according to embodiments of the disclosure.

FIG. 8 is a flowchart of a method for controlling a camera module according to embodiments of the disclosure. As illustrated in FIG. 8, the method includes the following.

At block 101, the camera module is driven to slide to the second position by controlling the driving component to drive the sliding component based on a call request on the camera module sent by a camera application, in response that the camera application runs in a system foreground.

When the camera application is launched, the call request on the camera module is sent. After the request is received, the driving component is controlled to drive the sliding component to drive the camera module to slide out from the first position to the second position, so as to provide photography service for the camera application.

It should be noted that, in addition to ordinary services, the camera application provides related functional services for live applications, short video applications, and other applications that require use of the camera module.

At block 102, it is determined whether a current application belongs to a preset application, in response to an application in the system foreground switching from the camera application to the current application.

In detail, when it is determined that the application in the system foreground is switched from the camera application to the current application, the camera module is not controlled to slide in immediately, but it is determined whether the user has the requirements to return to the camera application in a short duration based on the current application. In the embodiments of the disclosure, it is determined whether the user has the requirements based on whether the current application belongs to the preset application.

In actual applications, when the user uses the camera application, the user may switch to the album application in order to check the quality of the photo, and then return to the camera application in a short duration to continue taking pictures, or when the user uses the camera application, a call request enters, and the user returns to the camera application after the call is over, or, when the user uses a live broadcasting application, the user may switch to a paying application, such as the Alipay application to check the amount if the user receives a reward message, and return to the live broadcasting application. Therefore, these target applications switched after the camera application belong to the preset application.

At block 103, it is determined whether a call request on the camera module sent by the current application is received in response that the current application belongs to the preset application.

In embodiments of the disclosure, if the current application does not belong to the preset application, it indicates that the user may not return to the camera application in a short duration. Therefore, the driving component is controlled to drive the sliding component to drive the camera module to slide into the first position.

At block 104, a delay recall instruction for delaying a preset duration is sent to the driving component to maintain the sliding component in the second position within the preset duration, in response that the call request is not received.

In embodiments of the disclosure, if the current application belongs to the preset application, it indicates that the user has the requirements of quickly returning to the camera application, thereby delaying the sliding-in of the camera module.

Certainly, in the embodiments, if the current application still has the requirements for calling the camera module, in order to ensure that the camera module does not slide into the body of the electronic device when returning to the camera application, it may ensure that the camera module provides complete functional services for the current application.

In embodiments of the disclosure, if the call request of the current application to the camera module is not obtained, the delay recall instruction for delaying the preset duration is sent to the driving component, so that the sliding component is maintained in the second position within the preset duration, that is, the camera module is not retracted within the preset duration. The preset duration is calibrated based on a large amount of experimental data, and is set based on a usual service duration of the preset application. In a possible implementation, based on the user's usual calling duration and a duration of viewing the album, the preset duration is set to one minute. In a possible implementation, in order to further improve flexibility of the method for controlling the camera module, the application characteristics of the current application are extracted, and the preset duration corresponding to each current application is determined according to the application characteristics of the current application. In another possible implementation, it is possible to analyze the user's operation intention according to the use operation information when using the camera application, and the preset duration is determined based on the user's operation intention. For example, it is recognized that the user's current operation intention is to browse the photo just taken in the album based on the user's voice information, and the determined preset duration is short. If the user's current operation intention is to find photos of a certain person in the album based on the user's voice information, the preset duration is long.

In embodiments of the disclosure, if the call request of the current application to the camera module is obtained, the sliding component is maintained in the second position, and when the release request of the current application to the camera module is obtained, the delay recall instruction for delaying the preset duration is sent to the driving component to maintain the sliding component in the second position within the preset duration.

For example, when the current application is an album application, it is determined whether the album application uses face encryption. If face encryption is used, the album application sends a call request on the camera module. After the face recognition is successful, a release request on the camera module is sent. At this time, the delay recall instruction for delaying the preset duration is sent to the driving component to maintain the sliding component in the second position within the preset duration.

Therefore, based on whether the current application has the call request on the camera module, an execution duration of delayed sliding-in is determined, so as to avoid the camera module from being recalled by the current application for a long duration, and the camera module is retracted after returning to the camera application, which prevents the camera module from sliding out for a long duration, so that waste of resources is caused and the chance of collision is increased.

In order to further improve the flexibility of the method for controlling the camera module within the preset duration, if the camera application does not require the function of the camera module, the sliding component is directly retracted even if the preset duration is not reached.

In embodiments of the disclosure, it is determined whether the current application is switched to running in the background within a preset duration. If the current application is still in the foreground, the camera module is controlled to not retract within the preset duration, and if the current application is switched to the background, the delay request is removed, and the camera module is controlled to determine the state based on whether the camera module is called. Therefore, if the application is switched to the camera application, the camera module does not need to be called again to provide services according to the camera module. If the application is not the camera application, the camera module is controlled to slide when the call request on the camera module is not received. Or, it is determined whether the screen of the electronic device is turned off. When the screen of the electronic device is turned off, it is obvious that the camera application does not have a functional requirement for the camera module at this time. Therefore, it is determined whether the current application is switched to the background to run within the preset duration, or whether the screen of the electronic device is turned off. If the current application is not switched to the background to run within the preset duration, or the screen of the electronic device is turned on, the sliding component is maintained in the second position within the preset duration. If the current application is switched to the background within the preset duration, or the screen of the electronic device is turned off, the driving component is controlled to drive the sliding component to drive the camera module to slide to the first position.

In order to make the method for controlling the camera module provided in the embodiments of the disclosure clearer to those skilled in the art, the following examples are combined with specific application scenarios. In the application scenario, the preset application is the album application, and the call request of the album application on the camera module is a face recognition request, the release request on the camera module is a successful face recognition, and the preset duration is one minute.

Figure 9:
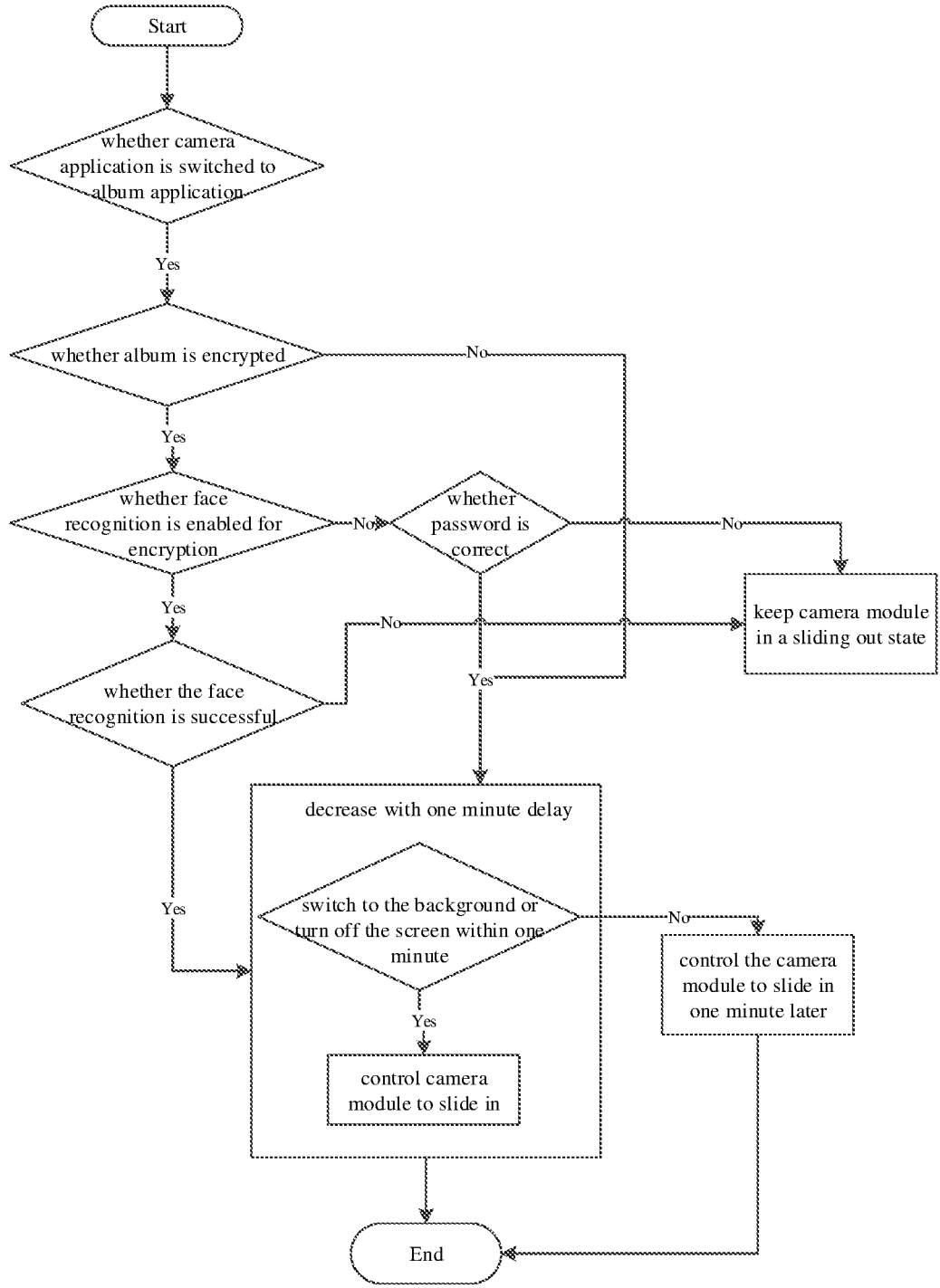
FIG. 9 is a flowchart of a method for controlling a camera module according to embodiments of the disclosure.

As illustrated in FIG. 9, when it is determined that the application currently running in the foreground is switched from the camera application to the album application, it is determined whether the album is encrypted. If the album is not encrypted through face or there is no encryption, a one-minute delay recall instruction is sent to the driving component. If face encryption is adopted by the album, the camera module is maintained in the sliding-out state to collect face information and provide the face information to the album application until the album application successfully recognizes the face based on the current face information.

In the embodiments, after sending the one-minute delay recall instruction, it is determined whether the album application has switched to the background and whether the screen of the electronic device is turned off within one minute. If the screen of the electronic device is turned off within one minute, or the album application is switched to the background, the one-minute delay recall instruction is released. Certainly, after one minute, if the album application is still running in the foreground and the screen of the electronic device is turned on, it indicates that the camera module is re-used, and the sliding component is controlled to slide in the first position.

In conclusion, with the method for controlling the camera module provided in the embodiments of the disclosure, the influence of related components on the screen-to-body ratio may be reduced through the sliding component, and the loss of the sliding component is reduced. When there is a control request for the camera module in a short duration, the camera module is maintained in a sliding-out state to avoid multiple operations of related components in the short duration. The length of duration when the camera module stays in the sliding-out state may be controlled, so that waste of resources due to the long operation duration is reduced and probability of the camera module being collided is reduced. A problem of multiple operations of the related components in a short duration due to the short operation duration may be avoided, and flexibility is great.

Figure 10:
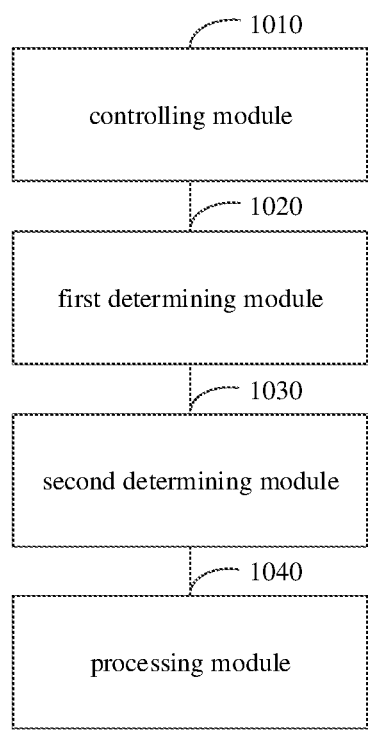
FIG. 10 is a block diagram of an apparatus for controlling a camera module according to embodiments of the disclosure.

In order to implement the above embodiments, the disclosure further provides an apparatus for controlling a camera module. The camera module is configured in an electronic device. The electronic device includes a body, a detecting component, a sliding component and a driving component. The driving component is configured to control the sliding component to slide between a first position received in the body and a second position exposed from the body. The detecting component includes a magnetic field generating element and a Hall element. The magnetic field generating element and the Hall element are respectively fixed on the sliding component and the body. The camera module is hard-wired to the sliding component. FIG. 10 is a block diagram of an apparatus for controlling a camera module according to embodiments of the disclosure. As illustrated in FIG. 10, the apparatus includes: a controlling module 1010, a first determining module 1020, a second determining module 1030 and a processing module 1040.

The controlling module 1010 is configured to drive the camera module to slide to the second position by controlling the driving component to drive the sliding component based on a call request on the camera module sent by a camera application, in response that the camera application runs in a system foreground.

In embodiments of the disclosure, the controlling module 1010 is configured to drive the camera module to slide to the first position by controlling the driving component to drive the sliding component in response that the current application does not belong to the preset application.

The first determining module 1020 is configured to determine whether a current application belongs to a preset application, in response to an application in the system foreground switching from the camera application to the current application.

The second determining module 1030 is configured to determine whether a call request on the camera module sent by the current application is received in response that the current application belongs to the preset application.

The processing module 1040 is configured to send a delay recall instruction for delaying a preset duration to the driving component to maintain the sliding component in the second position within the preset duration, in response that the call request is not received.

It should be noted that the description focused on the embodiments of the method for controlling the camera module is also applicable to the apparatus for controlling the camera module provided in the embodiments of the disclosure, and the details are not repeated herein.

In conclusion, with the apparatus for controlling the camera module provided in the embodiments of the disclosure, the influence of related components on the screen-to-body ratio may be reduced through the sliding component, and the loss of the sliding component is reduced. When there is a control request for the camera module in a short duration, the camera module is maintained in a sliding-out state to avoid multiple operations of related components in the short duration. The length of duration when the camera module stays in the sliding-out state may be controlled, so that waste of resources due to the long operation duration is reduced and probability of the camera module being collided is reduced. A problem of multiple operations of the related components in a short duration due to the short operation duration may be avoided, and flexibility is great.

In order to implement the above embodiments, the disclosure further provides an electronic device. As illustrated in FIGS. 1-4, the electronic device includes a body 10, a detecting component 30 and a driving component 50. The driving component 50 is configured to control the sliding component to drive the camera module 42 to slide between the first position received in the body and the second position exposed from the body. The detecting component includes a magnetic field generating element 32 and a Hall element 34. The magnetic field generating element 32 and the Hall element 34 are respectively fixed on the sliding component 20 and the body 10. The electronic device further includes: a memory 70, a processor electrically coupled to the sliding component, and a computer program stored on the memory 70 and for running on the processor 60. When the processor executes the program, the method for controlling the camera module according to the above embodiments is performed.

It should be noted that the electronic device described in the foregoing embodiments of the method for controlling the camera module is also applicable to the electronic device provided in the embodiments of the disclosure, and implementation details and technical effects are not repeated herein.

In order to implement the above embodiments, the embodiments of the disclosure provide a computer-readable storage medium on which a computer program is stored. When the program is executed by a processor, the method for controlling the camera module as described in the above method embodiments is performed.

Reference throughout this specification to "an embodiment," "some embodiments," "an example," "a specific example," or "some examples," means that a particular feature, structure, material, or characteristic described in connection with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples.

Although the embodiments of the disclosure are shown and described, those of ordinary skill in the art understand that various changes, modifications, substitutions and modifications are made to these embodiments without departing from the principle and purpose of the disclosure, and the scope of the disclosure is defined by the claims and their equivalents.

What is claimed is:

1. A method for controlling a camera module in an electronic device, wherein the camera module is removable between a first position received in a body of the electronic device and a second position exposed from the body; and the method comprises:
   driving the camera module to slide to the second position based on a call request on the camera module sent by a camera application, in response to the camera application running in a system foreground;
   determining whether a current application is a preset application, in response to an application in the system foreground switching from the camera application to the current application;
   determining whether receiving a call request on the camera module sent by the current application in response to the current application being the preset application; and
   maintaining the camera module in the second position within a preset duration, in response to not receiving the call request.

2. The method as claimed in claim 1, further comprising:
   driving the camera module to slide to the first position in response to the current application being not the preset application.

3. The method as claimed in claim 1, further comprising:
   maintaining the camera module in the second position in response to receiving the call request; and
   maintaining the camera module in the second position within the preset duration in response to acquiring a release request of the current application on the camera module.

4. The method as claimed in claim 3, wherein the current application is an album application, the call request is a face recognition request, and acquiring the release request of the current application on the camera module comprises:
   obtaining a face recognition success request sent by the album application.

5. The method as claimed in claim 1, further comprising:
   before maintaining the camera module in the second position within the preset duration,
   determining that the current application is not switched to run in the background within the preset duration, or the screen of the electronic device is turned on.

6. The method as claimed in claim 5, further comprising:
   driving the camera module to slide to the first position, in response to the current application being switched to run in the background within the preset duration, or the screen of the electronic device being turned off.

7. The method as claimed in claim 1, further comprising:
   obtaining operation information on the camera application;
   determining an operation intention based on the operation information; and
   determining the preset duration based on the operation intention.

8. The method as claimed in claim 1, further comprising:
   obtaining application characteristics of the current application; and
   determining the preset duration based on the application characteristics.

9. An electronic device, comprising:
   a body,
   a camera module removable between a first position received in the body of the electronic device and a second position exposed from the body,
   a memory, a processor electrically coupled to the memory, and
a computer program stored on the memory and for running on the processor,
in which the processor is configured to, execute the computer program on the memory to:
drive the camera module to slide to the second position based on a call request on the camera module sent by a camera application, in response to the camera application running in a system foreground;
determine whether a current application is a preset application, in response to an application in the system foreground switching from the camera application to the current application;
determine whether receiving a call request on the camera module sent by the current application in response to the current application being the preset application; and
maintain the camera module in the second position within a preset duration, in response to not receiving the call request.

10. The device as claimed in claim 9, wherein the processor is configured to execute the computer program on the memory to:
drive the camera module to slide to the first position in response to the current application being not the preset application.

11. The device as claimed in claim 9, wherein the processor is configured to execute the computer program on the memory to:
maintain the camera module in the second position in response to receiving the call request; and
maintain the camera module in the second position within the preset duration in response to acquiring a release request of the current application on the camera module.

12. The device as claimed in claim 11, wherein the current application is an album application, the call request is a face recognition request, and the processor is configured to execute the computer program on the memory to acquire the release request of the current application on the camera module by an act of:
obtaining a face recognition success request sent by the album application.

13. The device as claimed in claim 9, wherein the processor is configured to execute the computer program on the memory to:
before maintaining the camera module in the second position within the preset duration, determine that the current application is not switched to run in the background within the preset duration, or the screen of the electronic device is turned on.

14. The device as claimed in claim 13, wherein the processor is configured to execute the computer program on the memory to:
drive the camera module to slide to the first position, in response to the current application being switched to run in the background within the preset duration, or the screen of the electronic device being turned off.

15. The device as claimed in claim 9, wherein the processor is configured to execute the computer program on the memory to:
obtain operation information on the camera application;
determine an operation intention based on the operation information; and
determine the preset duration based on the operation intention.

16. The device as claimed in claim 9, wherein the processor is configured to execute the computer program on the memory to:
obtain application characteristics of the current application; and
determine the preset duration based on the application characteristics.

17. A non-transitory computer-readable storage medium with a computer program stored thereon, wherein in response that the computer program is executed by a processor of an electronic device, the electronic device is caused to perform a method for controlling a camera module in the electronic device, in which the camera module is removable between a first position received in a body of the electronic device and a second position exposed from the body, and the method comprises:
driving the camera module to slide to the second position based on a call request on the camera module sent by a camera application, in response to the camera application running in a system foreground;
determining whether a current application is a preset application, in response to an application in the system foreground switching from the camera application to the current application;
determining whether receiving a call request on the camera module sent by the current application in response to the current application being the preset application; and
maintaining the camera module in the second position within a preset duration, in response to not receiving the call request.

18. The non-transitory computer-readable storage medium as claimed in claim 17, wherein the method further comprises:
driving the camera module to slide to the first position in response to the current application being not the preset application.

19. The non-transitory computer-readable storage medium as claimed in claim 17, wherein the method further comprises:
maintaining the camera module in the second position in response to receiving the call request; and
maintaining the camera module in the second position within the preset duration in response to acquiring a release request of the current application on the camera module.

20. The non-transitory computer-readable storage medium as claimed in claim 19, wherein the current application is an album application, the call request is a face recognition request, and acquiring the release request of the current application on the camera module comprises:
obtaining a face recognition success request sent by the album application.

* * * * *